United States Patent Office 2,750,416
Patented June 12, 1956

2,750,416

(TERT.-ALKYL) AMINOMETHYLPHENOLS AND METHOD FOR THEIR PREPARATION

Lawrence J. Exner and W E Craig, Philadelphia, Pa., assignors to Rohm & Haas Company, Philadelphia, Pa., a corporation of Delaware No Drawing. Application December 21, 1950, Serial No. 202,136

16 Claims. (Cl. 260—570.9)

This invention deals with alkylaminomethylphenols in which the alkyl group contains at least four carbon atoms and is attached to nitrogen at a tertiary carbon atom thereof. It further deals with a method for preparing these compounds wherein a methylol-forming phenol and a tert.-alkylazomethine are reacted together.

The reaction of phenols, formaldehyde, and primary amines has been found to yield nitrogenous resins which vary in character with choice of reactants, their proportions, and conditions of reaction. The usual primary amines form methylol compounds upon addition of formaldehyde, and the dimethylol compounds together with formaldehyde cause the linking together of phenyl groups to give complex molecules of varying or indefinite size and structure. In contrast to this situation disclosed by the prior art, the method of this invention leads to compounds of rather well defined composition. These new compounds find uses in the fields of fungicides, insecticides, plasticizers, softeners, pharmaceuticals, etc.

For this reaction there are used methylol-forming phenols; i. e., phenols which have available for substitution at least one position which is ortho or para to a phenolic hydroxyl group. While such phenols may be polynuclear, they contain but one free phenolic hydroxyl group per phenyl nucleus. The methylol-forming phenols may contain such ring substituents as one or more halogens, fluorine, chlorine, bromine, or iodine, or a nitro, aminomethyl, alkyl, alkoxy, or thio group or two or more of such atoms or such groups, and they should be free of acidic substituents, including additional phenolic hydroxyl groups, carboxyl groups, sulfonic groups, and the like, groups which are reactive toward amines or azomethines. Thiophenols react with tert.-alkylazomethines in the same way as normal phenols, although thiophenols fail to condense with formaldehyde and amines, entering into an oxidation-reduction reaction.

Typical phenols which can be used as starting materials include phenol, thiophenol, cresol, thiocresol, ethylphenol, butylphenol, amylphenol, octylphenol, dodecylphenol, methylbutylphenol, methyloctylphenol, dimethylphenols, phenylphenol, benzylphenol, cyclohexylphenol, methallylphenol, allylphenol, or other hydrocarbon-substituted phenol, said hydrocarbon-substituted phenol having preferably not over twelve carbon atoms in the hydrocarbon substituent or substituents, mono-, di-, or tri-chlorophenols or mono-, di-, or tri-bromophenols in which an ortho or para position is available for substitution, chloronitrophenol, bromonitrophenol, chlorothiophenol, methoxyphenol, o- or p-(dimethylaminomethyl)-phenol, p-butyl-o-dimethylaminomethylphenol, p-butyl-o-tert.-butylaminomethylphenol, or other monohydric phenol which has a free ortho or para position available for substitution and which is free of acidic substituents. Polynuclear phenols include biphenol, diisobutylbiphenol, dichlorobiphenol, diphenyloldimethylmethane, diphenyl-olethylmethylmethane, dihydroxyphenyl sulfide, 4,4'-dihydroxy ditolyl sulfide, bis(2-hydroxy-5-butylphenyl) sulfide, bis(2-hydroxy-5-chlorophenyl) sulfide, bis(2-hydroxy-5-bromophenyl) sulfide, dihydroxyphenyl sulfoxide, dihydroxyphenyl sulfone, 4,4'-dihydroxy ditolyl sulfone, and the like. These phenols may be represented by the formulas

or

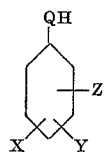

where, in particular, Q represents oxygen or sulfur, X represents hydrogen, a halogen, a hydrocarbon, a nitro, or an alkoxy group, Y represents hydrogen, chlorine, bromine, or an alkyl group, Z represents hydrogen, chlorine, bromine, or the like, and Ar is an aryl group, or

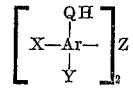

or

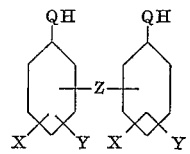

where Z is a thio linkage or a methylene linkage and Ar, Q, X, and Y are as above.

As azomethines, there can be used compounds of the formula

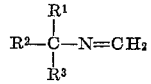

where $R^1$, $R^2$, and $R^3$ are ordinarily alkyl groups having a total carbon atom content of not over eighteen, and preferably a carbon atom content from three to fourteen carbon atoms. A particularly useful method for preparing these azomethines is described by Bortnick and Hurwitz in application Serial No. 143,834, now Patent No. 2,582,128, filed February 11, 1950. An alkylamine, $RNH_2$, in which the R group is a tertiary alkyl group, is reacted below 100° C. with formaldehyde in the molar ratio of about one to one. The resulting condensates are peculiarly stable. Many of them are distillable under reduced pressure. Yet they need not be isolated for purposes of the present invention, but may be used in the reaction mixture in which they are formed. Thus, tert.-butylamine and formaldehyde yield tert.-butylazomethine; neopentyldimethylcarbinylamine and formaldehyde yield neopentyldimethylcarbinylazomethine; tert.-dodecylamine and formaldehyde yield tert.-dodecylazomethine; tert.-tetradecylamine and formaldehyde yield tert.-tetradecylazomethine; etc. A particular form of this last azomethine is octylethylpropylcarbinylazomethine.

Methylol-forming phenol and azomethine are reacted by mixing them together in about reacting proportions. The reaction may desirably be effected in the presence of an inert organic solvent such as naphtha, benzene, or toluene although solvent is not essential. The reaction in some cases is hastened or carried to completion by heating, temperatures up to 110° C. or more being permissible and in many cases quite helpful. The product separates as an oil or as a solid, which is primarily monomeric in nature. Crystalline solids can often be obtained from the oils when cooled and seeded. The solids can be recrystallized to give pure products. The products can be converted to salts and in practically all cases the salts can be obtained as crystalline products.

Several methods for preparing the compounds of this invention are illustrated in the examples which follow. Parts are by weight.

*Example 1*

There was placed in a reaction vessel equipped with thermometer, reflux condenser, and stirrer 151.7 parts of tert.-butylamine. While the reaction vessel was cooled in an ice bath and its contents were stirred, there was added to the amine 177.7 parts of an aqueous 36.8% formaldehyde solution over a 25-minute period. The temperature during this time was held at 21°–25° C. The reaction mixture was then stirred for 30 minutes with the temperature at 22° C., cooled in an ice bath, and treated with 50 parts of an aqueous 85% potassium hydroxide solution. Two layers formed and were separated. The oil layer was distilled through a short packed column, by this means polymer in the oil being readily cracked. There was obtained at 63°–65° C. at atmospheric pressure 140 parts of product which corresponded in composition to tert.-butylazomethine. This was redistilled at 63.5°–64.5° C. to give a 72% yield of pure product.

*Example 2*

There was placed in the reaction vessel 387.6 parts of tert.-octylamine and thereto was slowly added with stirring and external cooling 262 parts of an aqueous 36% formaldehyde solution. The temperature during the addition did not rise above 25° C. The reaction mixture was stirred for 1.25 hours at 20° C. and then allowed to form layers, which were separated. The oil layer was dried over sodium hydroxide pellets and distilled at 149°–157° C. to yield 387 parts of tert.-octylazomethine. The product had a neutral equivalent of 141.1 (theory 141.2).

*Example 3*

There was placed in the reaction vessel 277.5 parts of tert.-dodecylamine (isoheptyldiethylcarbinylamine) followed by 130 parts of aqueous 37% formaldehyde solution. The temperature was allowed to rise just short of the refluxing temperature. The mixture was stirred for an hour and then cooled. Layers were allowed to form and were separated. The oil layer was dried on sodium hydroxide pellets and then distilled under reduced pressure. The fraction taken at 125°–140° C./10 mm. corresponded in composition to tert.-dodecylazomethine. It had the structure

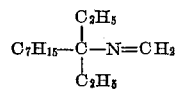

*Example 4*

By the same procedure there were reacted 87 parts of aqueous 37% formaldehyde solution and 213 parts of octylethylpropylcarbinylamine. The product was collected at 156°–187° C./40 mm. and corresponded in composition to

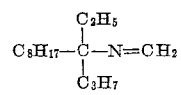

*Example 5*

In a reaction vessel equipped with stirrer, thermometer, and reflux condenser there was placed a solution of 59.3 parts of 2,4,5-trichlorophenol in 220 parts of benzene. Thereto was added over a period of about ten minutes a solution of 25.5 parts of tert.-butylazomethine in 45 parts of benzene. The temperature of the reaction mixture rose to 43° C. The mixture was left standing for several hours, the temperature thereof dropping to about 25° C. A solid separated. It was filtered off and washed with ethanol to give 71.5 parts of a pale violet solid, which corresponded in composition to 2,4,5-trichloro-6-(tert.-butylaminomethyl) phenol. This product decomposed when heated at 180°–181° C. The yield was 84%.

*Example 6*

To 28.2 parts of tert.-octylazomethine was added 28.8 parts of beta-naphthol. In about five minutes a homogeneous liquid formed. The temperature thereof rose to 78° C. This was taken up in a mixture of naphtha and ethylene dichloride and a solid crystallized therefrom, which was filtered off. It was light tan in color, melted at 81°–84° C. and corresponded in composition to tert.-octylaminomethyl-beta-naphthol. There was also obtained from the reaction system bis(2-hydroxynaphthyl)methane.

*Example 7*

To 42.2 parts of tert.-tridecylazomethine there was added 34.7 parts of 2-chloro-4-nitrophenol over a five-minute period. The temperature of the mixture rose to 35° C. When the mixture was heated on a steam bath, there was observed an exothermal effect which raised the temperature from 95° C. to 103° C. Heating on the steam bath was continued for an hour. The reaction mixture was stripped at 100° C. under 15 mm. pressure to yield a viscous red oil which corresponded in composition to pure 2-chloro-4-nitro-6-(tert.-tridecylaminomethyl)phenol.

A very similar compound is obtained from 2-chloro-4-nitrophenol and tert.-dodecylazomethine in which the dodecyl group is derived from a propylene tetramer.

*Example 8*

There was placed in a reaction vessel 28.2 parts of tert.-octylazomethine and thereto was added 22.8 parts of diphenyloldimethylmethane (4—HOC₆H₄)₂C(CH₃)₂. The temperature of the mixture rose slowly to 65° C. The reaction mixture was heated for an hour on a steam bath and stripped at 130° C./15 mm. to yield 51 parts of a clear, brown, viscous liquid. This contained 5.4% of nitrogen (theory 5.48%). It was bis(4-hydroxy-3-tert.-octylaminomethylphenyl)dimethylmethane. This was recrystallized from naphtha. It then melted at 92° C. to 100° C.

In the same way there may be reacted other diphenylolmethanes, the two phenylol groups being joined through a saturated hydrocarbon group at a single carbon atom thereof. This type of compound is conveniently represented by the formula

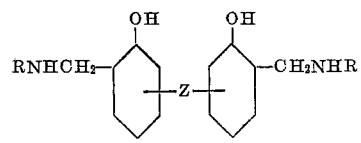

Z being a divalent hydrocarbon linkage and R a tert.-alkyl group.

*Example 9*

There were mixed 41.2 parts of p-diisobutylphenol and 28.2 parts of tert.-octylazomethine. The temperature of the mixture rose to 40° C. The reaction mixture was heated on a steam bath for 2.5 hours and then washed with a dilute sodium hydroxide solution to remove unreacted phenol and to form an oil layer, which was separated and stripped at 100° C./15 mm. There was obtained 2-tert.-octylaminomethyl-4-diisobutylphenol in a yield of 59.5 parts and a purity of 99.3%. The nitrogen content by analysis was 4.0% (theory 4.03%). This product was recrystallized from methanol and then melted at 50°–54° C.

Reaction of this compound with dilute phosphoric acid gave a pale yellow crystalline solid upon treatment with acetone. This solid softened at about 200° C. and was completely melted at 225° C.

The above compound was a very effective moth-proofing agent. It was also an antioxidant.

Example 10

There were reacted 37.8 parts of 2,4-dibromophenol and 21.2 parts of tert.-octylazomethine. The temperature of the reacting mixture rose rapidly to 80° C. and then fell. The reaction mixture solidified. It was recrystallized from naphtha to yield 40.7 parts of a yellow solid which melted at 148°–149° C. The yield was 86.3% of 99.4% pure 2,4-dibromo-6-tert.-octylaminomethylphenol. This compound had insecticidal properties.

Example 11

To 28.2 parts of tert.-octylazomethine there was added 45.8 parts of 2-bromo-4-tert.-butylphenol. The temperature of the reacting mixture rapidly rose to 80° C. The mixture was heated on a steam bath for two hours and then stripped at 100° C./13 mm. to yield 74.5 parts of a yellow solid, which melted at 74°–79° C. It corresponded in composition to 2-bromo-4-tert.-butyl-6-tert.-octylaminomethylphenol.

Example 12

To 63.5 parts of tert.-octylazomethine there was added 16.5 parts of thiophenol during a three-minute period. The temperature of the reacting mixture rapidly rose to 55° C. and fell slowly. The mixture was heated for two hours on a steam bath and then stripped at 100° C./12 mm. to yield 34.8 parts of a clear, brown oil. This was tert.-octylaminomethylthiophenol. This compound has insecticidal properties.

Example 13

There were mixed 68 parts of tert.-octylazomethine and 69 parts of bis(2-hydroxy-5-chlorophenyl)sulfide over a 20-minute period. The temperature of the reacting mixture rose slowly to 65° C. with the formation of a viscous liquid. The mixture was heated on a steam bath for three hours. After about 1.5 hours on the steam bath the reaction mixture began to solidify and at the end of two hours was completely solid. The solid was extracted several times with hot naphtha. There was obtained 101 parts of a light yellow solid which melted at 135°–138° C. It corresponded in composition to bis(2-hydroxy - 3-tert.-octylaminomethyl-5-chlorophenyl) sulfide.

While the reaction is conveniently accomplished with a pure alkylazomethine and a methylol-forming phenol, the azomethine need not be isolated but may be formed by reacting together a tert.-alkylamine and aqueous formaldehyde and the resulting reaction mixture combined with a methylol-forming phenol.

Example 14

To 135.8 parts of tert.-octylamine there was added 89.7 parts of aqueous 36.8% formaldehyde solution with the temperature of the mixture kept at 22°–25° C. The mixture was stirred for a half-hour. There was then added 143.5 parts of bis(2-hydroxy-5-chlorophenyl) sulfide. The temperature of the mixture rose to 45° C. and the mixture became viscous. It was heated for an hour at 80° C., left standing overnight, and heated at 80° C. for two hours. When the reaction mixture was cooled, it solidified. The solid was dissolved in benzene. The solution was filtered and evaporated to give a yellow solid. This was recrystallized from ethanol. The recrystallized product melted at 141°–145° C. The yield was 71% of bis(2 - hydroxy-3-tert.-octylaminomethyl-5-chlorophenyl) sulfide.

In place of tert.-octylazomethine used above, there may be used other tert.-alkylazomethines from tert.-butyl upward. The products have the structure

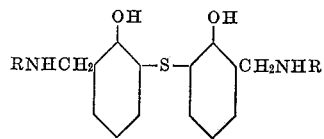

The phenyl rings may be substituted with one or more non-acidic groups.

Example 15

There were mixed 21.6 parts of thiocresol and 43 parts of tert.-octylazomethine. The temperature of the reacting mixture rose to 61° C. The mixture was then heated on a steam bath for two hours and stripped at 100° C./15 mm. to yield a light brown oil. This corresponded in composition to methyl-tert.-octylaminomethylthiophenol.

Example 16

There were reacted 214 parts of bis(2-hydroxy-5-chlorophenyl) sulfide suspended in 400 parts of toluene and 127 parts of tert.-butylazomethine. The temperature of the mixture rose to 40° C. It was noted that when half of the azomethine had been added to the toluene solution, the reaction mixture became clear. The mixture was stirred for an hour with the temperature dropping to 33° C. and then heated on a steam bath at a temperature of 88° C. There was distilled off a fraction of 88 parts which contained solvent and azomethine. It appeared that about 90% of the tert.-butylazomethine had reacted. The reaction mixture was left at room temperature overnight. A solid separated out. It was filtered off, dried, and analyzed. It contained 5.1% of nitrogen and appeared, therefore, to be a mixture of about 70% of the di-butylaminomethyl product and 30% of the mono-butylaminomethyl product. This solid melted at 135°–145° C.

From the filtrate there was obtained an evaporation 235 parts of a yellow solid which melted between 85° C. and 130° C. By analysis this product contained 5.8% of nitrogen and was a mixture of 90.6% of the di-butylaminomethyl derivative and 9.4% of the mono-butylaminomethyl derivative.

In a preparation from bis(2-hydroxy-5-chlorophenyl) sulfide and tert.-butylazomethine wherein no solvent was used, the product obtained was chiefly bis(2-hydroxy-3-tert.-butylaminomethyl - 5 - chlorophenyl) sulfide. This product melted between 65° C. and 95° C.

Example 17

There were mixed 75 parts of p-tert.-butylphenol and 43 parts of a tert.-butylazomethine. After the initial rise in temperature was over, the reaction mixture was heated for two hours on a steam bath. A yellow oil was obtained in a yield of 98%. By analysis it was 2-tert.-butylaminomethyl - 4 - tert. - butylphenol. This compound was an excellent aphicide. It was a good inhibitor against gas-feeding of dyed cellulose acetate. As the above product stood, it crystallized and then melted at 58° C.–61° C.

Example 18

There were mixed 85 parts of tert.-butylazomethine and 197.5 parts of 2,4,5 - trichlorophenol. The reaction mixture was heated on a steam bath and stripped at 110° C./12 mm. There was obtained in 50% yield a pale violet solid which corresponded in composition to 2,4,5-trichloro - 6 - tert. - butylaminomethylphenol. It decomposed when heated to 179° C.

Example 19

There were reacted together 75 parts of p-tert.-butylphenol and 71 parts of tert.-octylazomethine. After the reaction mixture had been heated on a steam bath for two hours, it was stripped at 100° C./15 mm. There was obtained 145 parts of a light tan oil which corresponded in composition to 2-tert.-octylaminomethyl-4-tert.-butylphenol. It was a good inhibitor for gas-fading of dyes.

*Example 20*

There were reacted together 34 parts of o-phenylphenol and 31 parts of tert.-octylazomethine by the method of the previous example. The product as obtained was an oil corresponding in composition to 2-phenyl-6(and 4)-tert.-octylaminomethylphenol.

A similar product is obtained on substitution of 35.2 parts of o-cyclohexylphenol for the phenylphenol.

*Example 21*

There were mixed 47 parts of phenol and 72 parts of tert.-octylazomethine. After the initial evolution of heat the mixture was heated on a steam bath for two hours and then stripped at 100° C./12 mm. The product, an oil, obtained in almost quantitative yield, was 97% pure tert.-octylaminomethylphenol.

*Example 22*

There were reacted as above 47 parts of phenol and 197 parts of tert.-octylazomethine. The product was a brown oil which was decomposed on distillation. The oil corresponded to bis(tert.-octylaminomethyl)phenol. The yield was 94%.

A repetition of the above reaction but with 47 parts of phenol and 131 parts of tert.-octylazomethine gave a brown oil which by analysis was 43.6% of the above bis(octylaminomethyl) phenol and 56.4% of the mono analogue.

*Example 23*

There were mixed 74 parts of o-methallylphenol and 67 parts of tert.-octylazomethine. The reaction was completed by heating on a steam bath. The reaction mixture was stripped at 100° C./12 mm. There was obtained in a 92% yield 2 - methallyl - 4 - (and 6-)tert.-octylaminomethylphenol as a red oil. It was an effective antioxidant and insecticide.

*Example 24*

There were mixed 51.5 parts of 2-caprylphenol and 50 parts of tert.-dodecylazomethine. The reaction mixture was heated on a steam bath for four hours and stripped at 110° C./1 mm. There was obtained a 97% yield of a product, a brown oil, which corresponded in composition to sec. - octyl-tert.-dodecylaminomethylphenol.

The reaction which is here-described may be summarized with reference to preferred phenol derivatives

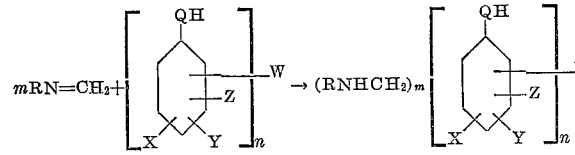

wherein Q is oxygen or sulfur, R is a tertiary alkyl group of four to eighteen carbon atoms, m and n are integers from one to two, X is hydrogen, a halogen, particularly chlorine or bromine, a hydrocarbon group, a nitro group, an alkoxy group, or an aminomethyl group, Y is hydrogen, chlorine, bromine, or alkyl, Z is hydrogen, chlorine or the like, and W is hydrogen when n has a value of one and a thio group or a methylene linkage when n has a value of two.

We claim:

1. A process for preparing tert.-alkylaminomethyl substituted phenols which comprises mixing and reacting together at a reacting temperature not exceeding about 110° C. a tert.-alkylazomethine and a methylol-forming phenol which has available for substitution hydrogen in at least one of the positions ortho and para to the phenolic hydroxyl group, which is free of acidic substituents, and which contains but one phenolic hydroxyl group per aryl nucleus.

2. A process for preparing tert.-alkylaminomethyl substituted phenols which comprises mixing and reacting together at reacting temperatures not exceeding about 110° C. an alkylazomethine having four to eighteen carbon atoms in the alkyl group, said alkyl group being attached to nitrogen at a tertiary carbon atom thereof, and a hydrocarbon-substituted monohydric phenol having available for substitution hydrogen in at least one of the positions ortho and para to the phenolic hydroxyl group and having not over twelve carbon atoms in the hydrocarbon substituent.

3. A process for preparing tert.-alkylaminomethyl substituted phenols which comprises mixing and reacting together at reacting temperatures not exceeding about 110° C. an alkylazomethine, having from four to eighteen carbon atoms in the alkyl group which is attached to nitrogen at a tertiary carbon atom thereof, and a halophenol having available for substitution hydrogen in at least one of the positions ortho and para to the phenolic hydroxyl group.

4. A process for preparing tert.-alkylaminomethyl substituted binuclear phenols which comprises mixing and reacting together at reacting temperatures not exceeding about 110° C. an alkylazomethine, having four to eighteen carbon atoms in the alkyl group which is attached to nitrogen at a tertiary carbon atom thereof, and a bis(hydroxyphenyl) compound which has available for substitution hydrogen in at least one of the positions ortho and para to a phenolic hydroxyl group, which is free of acidic substituents, and which has but one phenolic hydroxyl group per phenyl nucleus.

5. A process for preparing bis(hydroxyphenyl)sulfides having tert.-alkylaminomethyl substituents, which comprises mixing and reacting together at reacting temperatures up to about 110° C. (1) an alkylazomethine having four to eighteen carbon atoms in the alkyl group thereof, said alkyl group being attached to nitrogen at a tertiary carbon atom, and (2) a bis(hydroxyphenyl)sulfide which has available for substitution hydrogen in at least one of the positions which occur ortho and para to a phenolic hydroxyl group, which is free of acidic substituents, and which has but one phenolic hydroxyl group per phenyl nucleus.

6. A process for preparing bis(2-hydroxy-3-tert.-alkyl-aminomethyl-5-chlorophenyl)sulfides which comprises mixing and reacting together at reacting temperatures up to about 110° C. at least two moles of an alkylazomethine having four to eighteen carbon atoms in the alkyl group thereof, said alkyl group being attached to nitrogen at a tertiary carbon atom, and one mole of bis(2-hydroxy-5-chlorophenyl)sulfide.

7. A process for preparing bis(hydroxyphenyl)methane having tert.-alkylaminomethyl substituents, which comprises mixing and reacting together at reacting temperatures up to about 110° C. an alkylazomethine having four to eighteen carbon atoms in the alkyl group thereof, said alkyl group being attached to nitrogen at a tertiary carbon atom, and a bis(hydroxyphenyl)methane which has available for substitution hydrogen in at least one of the positions which occur ortho and para to a phenolic hydroxyl group, which is free of acidic substituents, and which has but one phenolic hydroxyl group per phenyl nucleus.

8. A process for preparing bis(3-tert.-alkylaminomethyl-4-hydroxyphenyl)dimethylmethanes, which comprises mixing and reacting together at reacting temperatures up to about 110° C. at least two moles of an alkylazomethine having four to eighteen carbon atoms in the alkyl group thereof, said alkyl group being attached to nitrogen at a tertiary carbon atom, and one mole of bis(hydroxyphenyl)dimethylmethane.

9. A process for preparing 2,4,5-trichloro-6-tert.-alkyl-aminomethylphenols, which comprises mixing and reacting together at reacting temperatures up to about 110° C. an alkylazomethine having four to eighteen carbon atoms in the alkyl group thereof, said alkyl group being attached to nitrogen at a tertiary carbon atom, and 2,4,5-trichlorophenol.

10. A process for preparing 2-tert.-alkylaminomethyl-4-diisobutylphenols which comprises mixing and reacting together at reacting temperatures up to about 110° C. an alkylazomethine having four to eighteen carbon atoms in the alkyl group thereof, said alkyl group being attached to nitrogen at a tertiary carbon atom, and 4-diisobutylphenol.

11. As new chemical substances, bis(hydroxyphenyl) compounds in which the phenyl nuclei are joined by a linkage from the class consisting of (a) a direct linkage, (b) linkage through a sulfur atom, and (c) linkage through a single carbon atom of an alkylene group of not over four carbon atoms, which have one hydroxyl group per phenyl group, which are free of acidic substituents, and which contain one or two tert.-alkylaminomethyl groups in a corresponding number of the positions which occur ortho and para to the phenolic hydroxyl groups, said tert.-alkyl group containing four to nineteen carbon atoms and being attached to nitrogen at a tertiary carbon atom thereof.

12. As new chemical substances, bis(hydroxyphenyl) compounds of the formula

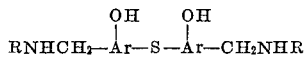

wherein Ar is a phenyl group which is free of acidic substituents and R is an alkyl group of four to nineteen carbon atoms joined to a nitrogen atom at a tertiary carbon atom, the RNHCH$_2$— group being substituted for hydrogen in one of the positions which occur ortho and para to the phenolic hydroxyl group.

13. As a new chemical substance, a compound of the formula

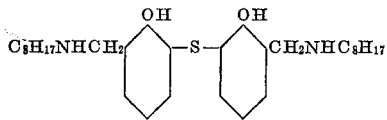

said C$_8$H$_{17}$ group being an alkyl group attached to nitrogen at a tertiary carbon atom thereof and having the structure (CH$_3$)$_3$CCH$_2$(CH$_3$)$_2$C—.

14. As a new chemical substance, a compound of the formula

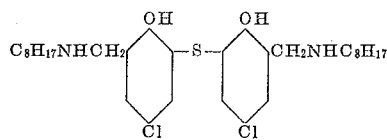

said C$_8$H$_{17}$ group being an alkyl group attached to nitrogen at a tertiary carbon atom thereof and having the structure (CH$_3$)$_3$CCH$_2$(CH$_3$)$_2$C—.

15. As new chemical substances, bis(hydroxyphenyl)-methanes of the formula

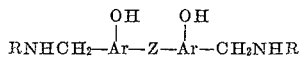

wherein Ar is a phenyl group which is free of acidic substituents, R is an alkyl group of four to fifteen carbon atoms joined to a nitrogen atom at a tertiary carbon atom thereof, the RNHCH$_2$— group being substituted for hydrogen in one of the positions which occur ortho and para to a phenolic hydroxyl group, and Z is an alkylene group of not over four carbon atoms which joins the two phenyl groups through a single carbon atom thereof.

16. As a new chemical substance, a compound of the formula

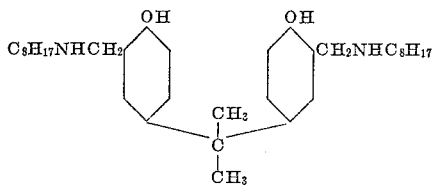

said C$_8$H$_{17}$ group being an alkyl group attached to nitrogen at a tertiary carbon atom thereof and having the structure (CH$_3$)$_3$CCH$_2$(CH$_3$)$_2$C—.

References Cited in the file of this patent

UNITED STATES PATENTS

| | | |
|---|---|---|
| 2,410,911 | Wasson et al. | Nov. 12, 1946 |
| 2,422,013 | Haury et al. | June 10, 1947 |

OTHER REFERENCES

Burckhalter et al., JACS, vol. 70, pp. 1363–73.